(12) United States Patent
Yamaguchi et al.

(10) Patent No.: US 9,594,526 B2
(45) Date of Patent: Mar. 14, 2017

(54) STORAGE MANAGEMENT DEVICE AND COMPUTER-READABLE RECORDING MEDIUM

(71) Applicant: FUJITSU LIMITED, Kawasaki-shi, Kanagawa (JP)

(72) Inventors: Akio Yamaguchi, Hekinan (JP); Makoto Yashiro, Ichinomiya (JP); Yuki Tamura, Nagoya (JP); Hajime Kondo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/923,498

(22) Filed: Oct. 27, 2015

(65) Prior Publication Data
US 2016/0170843 A1 Jun. 16, 2016

(30) Foreign Application Priority Data
Dec. 12, 2014 (JP) .................. 2014-251814

(51) Int. Cl.
*G06F 3/06* (2006.01)
*G06F 11/14* (2006.01)
*G06F 11/20* (2006.01)

(52) U.S. Cl.
CPC .......... *G06F 3/0683* (2013.01); *G06F 3/0604* (2013.01); *G06F 3/0619* (2013.01); *G06F 3/0647* (2013.01); *G06F 11/2069* (2013.01); *G06F 11/2082* (2013.01)

(58) Field of Classification Search
CPC .... G06F 3/0619; G06F 3/0689; G06F 3/0665; G06F 3/0605; G06F 9/5016
See application file for complete search history.

(56) References Cited

U.S. PATENT DOCUMENTS

| | | | |
|---|---|---|---|
| 2004/0260976 A1* | 12/2004 | Ji ...................... | G06F 11/2069 714/31 |
| 2006/0248304 A1 | 11/2006 | Hosouchi et al. | |
| 2008/0172572 A1* | 7/2008 | Beardsley ........... | G06F 11/2069 714/6.12 |
| 2010/0057789 A1* | 3/2010 | Kawaguchi ......... | G06F 11/1456 707/E17.005 |
| 2011/0078396 A1 | 3/2011 | Hiraiwa et al. | |

(Continued)

FOREIGN PATENT DOCUMENTS

JP 2006-309638 11/2006
JP 2011-076130 4/2011

*Primary Examiner* — Hiep Nguyen
(74) *Attorney, Agent, or Firm* — Fujitsu Patent Center

(57) ABSTRACT

When a failure occurs in a storage device, a backup unit specifies LUNs of a copy source and a copy destination to an operation volume for which a process is not taken over to another storage device and instructs to perform a copy. When a copy processing unit in the storage device receives a copy process to be performed in the operation volume, the copy processing unit performs the copy process by using the specified LUNs of the copy source and the copy destination. If an error occurs without the copy process being taken over to another storage device due to the occurrence of a failover, the backup unit acquires the LUNs of two volumes of a copy pair and the volumes each constituting each of cluster pairs. Then, the backup unit again performs the copy process by using the acquired LUNs.

5 Claims, 12 Drawing Sheets

(56) References Cited

U.S. PATENT DOCUMENTS

| | | | |
|---|---|---|---|
| 2012/0221521 A1* | 8/2012 | Chiu | G06F 11/3485 707/622 |
| 2014/0032959 A1* | 1/2014 | Dawkins | G06F 11/2048 714/6.3 |
| 2014/0114644 A1* | 4/2014 | Smith | H04L 41/145 704/9 |
| 2014/0195483 A1* | 7/2014 | Clayton | G06F 11/2069 707/622 |
| 2015/0200818 A1* | 7/2015 | Winkelstrater | G06F 11/2038 709/223 |
| 2015/0269042 A1* | 9/2015 | Jain | G06F 11/1658 714/6.3 |
| 2015/0278049 A1* | 10/2015 | Saito | G06F 3/0617 714/6.3 |
| 2015/0363319 A1* | 12/2015 | Qi | G06F 3/0619 711/121 |

* cited by examiner

FIG.10

| COPY SOURCE INFORMATION | | COPY DESTINATION INFORMATION | | COPY SOURCE PAIR INFORMATION | | COPY DESTINATION PAIR INFORMATION | |
|---|---|---|---|---|---|---|---|
| BoxID | LUN | BoxID | LUN | BoxID | LUN | BoxID | LUN |
| A | 0x3 | A | 0x5 | B | 0x4 | B | 0x2 |
| ⋮ | ⋮ | ⋮ | ⋮ | ⋮ | ⋮ | ⋮ | ⋮ |

FIG.11

| IDENTIFICATION NAME (USER'S OPTION) | BoxID | IP ADDRESS | ACCESS PATH |
|---|---|---|---|
| ETX | A | 1.1.1.1 | /dev/sde |
| ETY | B | 1.1.1.2 | /dev/sdf |

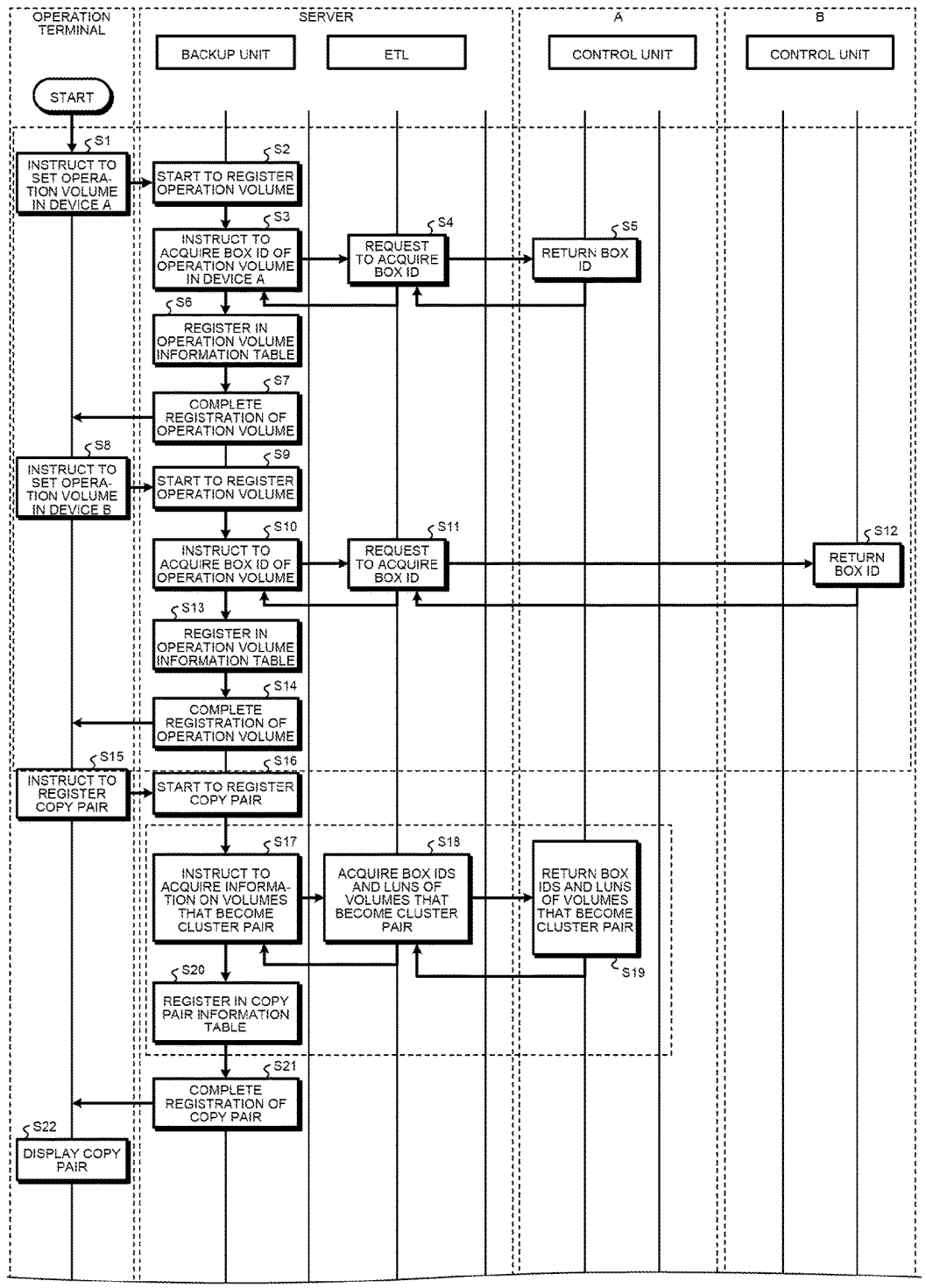

STORAGE MANAGEMENT DEVICE AND COMPUTER-READABLE RECORDING MEDIUM

CROSS-REFERENCE TO RELATED APPLICATION

This application is based upon and claims the benefit of priority of the prior Japanese Patent Application No. 2014-251814, filed on Dec. 12, 2014, the entire contents of which are incorporated herein by reference.

FIELD

The embodiment discussed herein is related to a storage management device and a computer-readable recording medium.

BACKGROUND

There is a storage cluster as one of technologies that improve reliability of storage devices. The storage cluster has a cluster structure constituted by a plurality of storage devices and is a technology that implements a failover in which, even if one of the storage devices is down due to a failure at a device level, business can be continued by another storage device.

The storage cluster can be set in units of volumes and automatically takes over Write/Read I/O of a storage device in which a failure has occurred to another storage device. Accordingly, this makes it possible for a user to continue the business without being aware of the occurrence of an abnormality and thus it is possible to reduce the recovery time and the workload imposed on a storage administrator.

A volume in the storage cluster can be implemented by allowing a host to indicate the volume as, for example, another path of the same volume. The "host" mentioned here is a device, such as a server or the like, that accesses the storage device, whereas the "path" mentioned here is a communication path between the host and the storage device. In the storage cluster, the path in operation is used as "active", the path on the waiting side is used as "standby", and only the active storage device can be accessed. If the storage device in operation is down, the storage cluster changes a path state, sets the path on the waiting side to active, automatically takes over Write/Read I/O.

Furthermore, regarding a storage cluster, there is a technology that implements an asynchronous remote copy that is used for a disaster recovery by performing a pair operation of an asynchronous remote copy by asynchronously working with an instruction to change a host writing destination volume in a storage clustering environment.

Furthermore, regarding a volume change, there is a technology that suppresses ID exhaustion in a host by changing a request for an access to a change source volume to a change destination volume by referring to a change table in which a change source volume ID in the host is associated with a change destination volume ID in the storage.

Patent Document 1: Japanese Laid-open Patent Publication No. 2011-76130
Patent Document 2: Japanese Laid-open Patent Publication No. 2006-309638

When an operation is performed with respect to a volume, a host converts a device name, of an operation target, that is commonly set for the storage devices to a logical unit number (LUN) and specifies the operation target by the LUN. The "LUN" mentioned here is an identification number for logically identifying a device for storage in the storage device.

Furthermore, in the plurality of storage devices constituting volumes in the storage cluster, the device names are made to match between the active and the standby storage devices; however, the LUNs do not need to be matched. The reason for this is that, in order to match LUNs of the active storage device and the standby storage device, the same configuration is needed in both the storage devices; therefore, the load imposed on an administrator is significantly increased. Accordingly, in the present state, LUNs are not made to match in most cases even if storage devices have association relationship of the active side and the standby side.

However, if a failover occurs when an operation of specifying a LUN of a volume in a storage cluster is performed, because the LUNs do not match between the volumes associated with the active side and the standby side, there is a problem in that a false volume is operated after the failover.

SUMMARY

According to an aspect of an embodiment, a storage management device that takes over, when a failure occurs in a first storage device, an operation performed in the first storage device to a second storage device, the storage management device including a memory and a processor coupled to the memory, the processor executing a process including: determining, when an error occurs in a copy that is instructed to a first storage area for which the copy is not taken over to the second storage device when a failure occurs in the first storage device, whether a takeover from the first storage device to the second storage device has been performed; converting, when it is determined at the determining that the takeover has been performed, a first copy source identifier and a first copy destination identifier for identifying a copy source and a copy destination, respectively, in the first storage device to a second copy source identifier and a second copy destination identifier for identifying a copy source and a copy destination, respectively, in the second storage device; and instructing a second storage area for which the copy is not taken over to the first storage device when a failure occurs in the second storage device, to perform the copy by using the second copy source identifier and the second copy destination identifier.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a schematic diagram illustrating an example of a copy pair information table;

FIG. 11 is a schematic diagram illustrating an example of an operation volume information table;

FIG. 12A is a first flowchart illustrating the flow of a process performed by the information processing system according to the embodiment;

DESCRIPTION OF EMBODIMENT

A Preferred embodiment of the present invention will be explained with reference to accompanying drawings. The disclosed technology is not limited to the embodiment.

First, cluster pairs and copy pairs will be described. The "cluster pair" mentioned here is volumes to be paired in a storage cluster. The "copy pair" mentioned here is a pair of volumes of the copy source and the copy destination and a pair of, for example, in a backup, a volume to be backed up and a backup volume.

Figure 1:
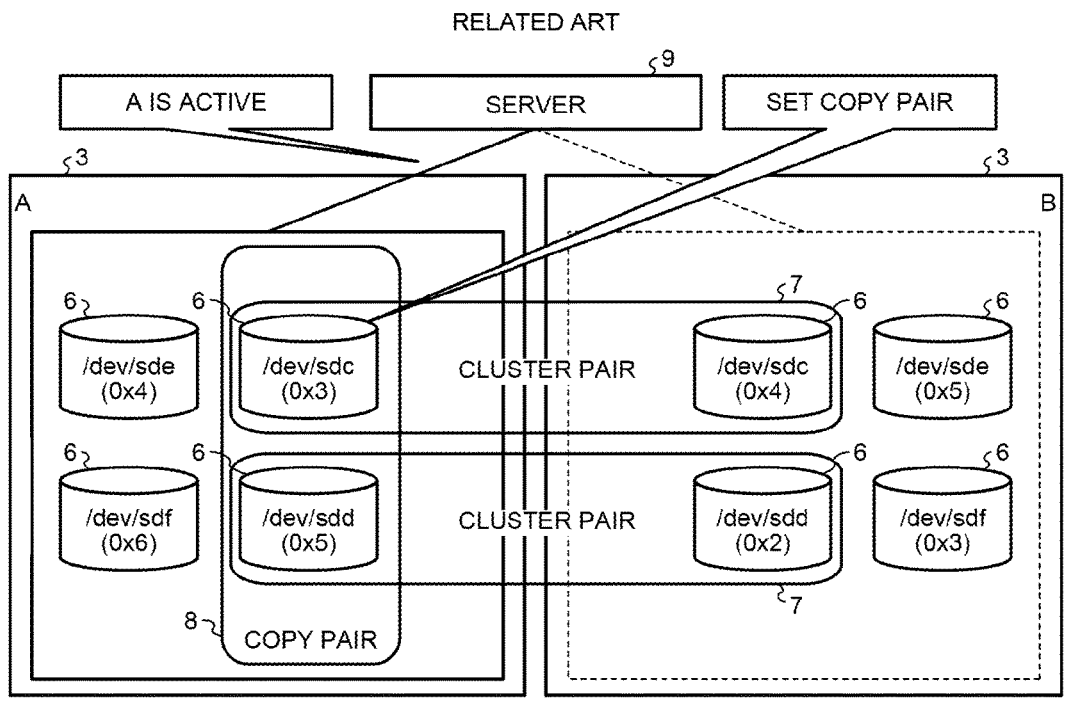
FIG. 1 is a schematic diagram illustrating cluster pairs and a copy pair.

FIG. 1 is a schematic diagram illustrating cluster pairs and a copy pair. In FIG. 1, the symbols A and B indicate storage devices 3 constituting a storage cluster. The storage device 3 represented by A is active, whereas B is standby. A server 9 is a computer that uses the storage cluster. The symbols of /dev/sdc, /dev/sdd, /dev/sde, and /dev/sdf indicate device names. The symbols of 0x2 to 0x6 indicate the LUNs. Here, "0x" represents a hexadecimal number.

As illustrated in FIG. 1, volumes 6 with the device name of /dev/sdc constitute a cluster pair 7 of the volume 6 with the LUN of 0x3 in A and the volume 6 with LUN of 0x4 in B. Furthermore, the volumes 6 with the device name of /dev/sdd constitute the cluster pair 7 of the volume 6 with the LUN of 0x5 in A and the volume 6 with the LUN of 0x2 in B. In this way, for the cluster pairs 7, the device names do match; however, the LUNs do not need to match. Furthermore, the volume 6 with the device name of /dev/sdc and the volume 6 with the device name of /dev/sdd are a copy pair 8.

Figure 2:
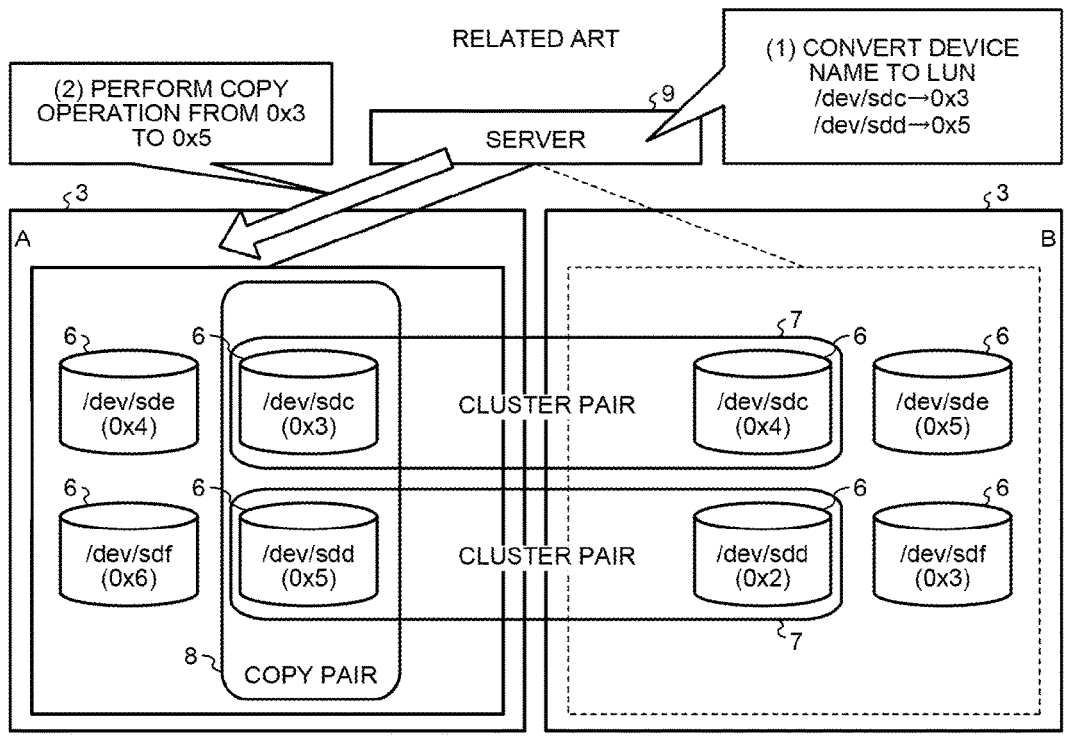
FIG. 2 is a schematic diagram illustrating a copy in the copy pair.

At this point, a storage administrator sends an instruction to copy the volume 6 with the device name of /dev/sdc to the volume 6 with the device name of /dev/sdd. Then, as illustrated in FIG. 2, the server 9 converts the device names to the LUNs (1) and instructs A to perform a copy operation after specifying the LUNs (2). Specifically, the server 9 converts /dev/sdc to 0x3 and converts /dev/sdd to 0x5. Then, the server 9 instructs A to copy from LUN (0x3) to LUN (0x5). Here, the LUN (0xn) represents the volume 6 with the LUN of 0xn.

Figure 3:
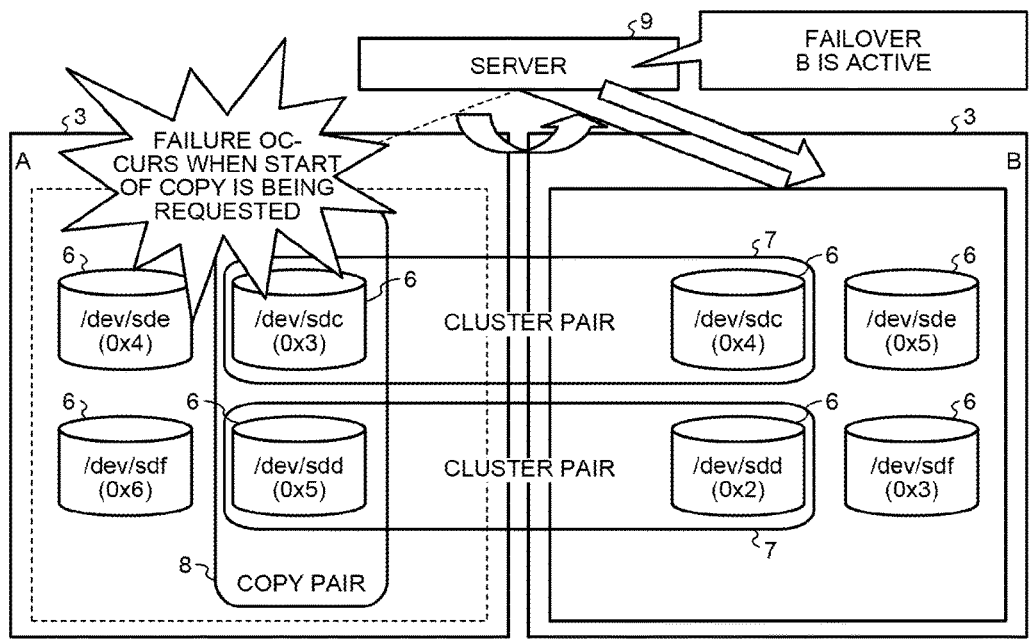
FIG. 3 is a schematic diagram illustrating a failover occurring when a start of a copy is being requested.

Then, as illustrated in FIG. 3, a failure occurs in A when a start of the copy is being requested and then the active storage device 3 is changed from A to B. Then, because the path state of the storage device 3 that is in operation is changed, a retry error of a small computer system interface (SCSI) command occurs and thus the SCSI command is automatically retried in B.

Figure 4:
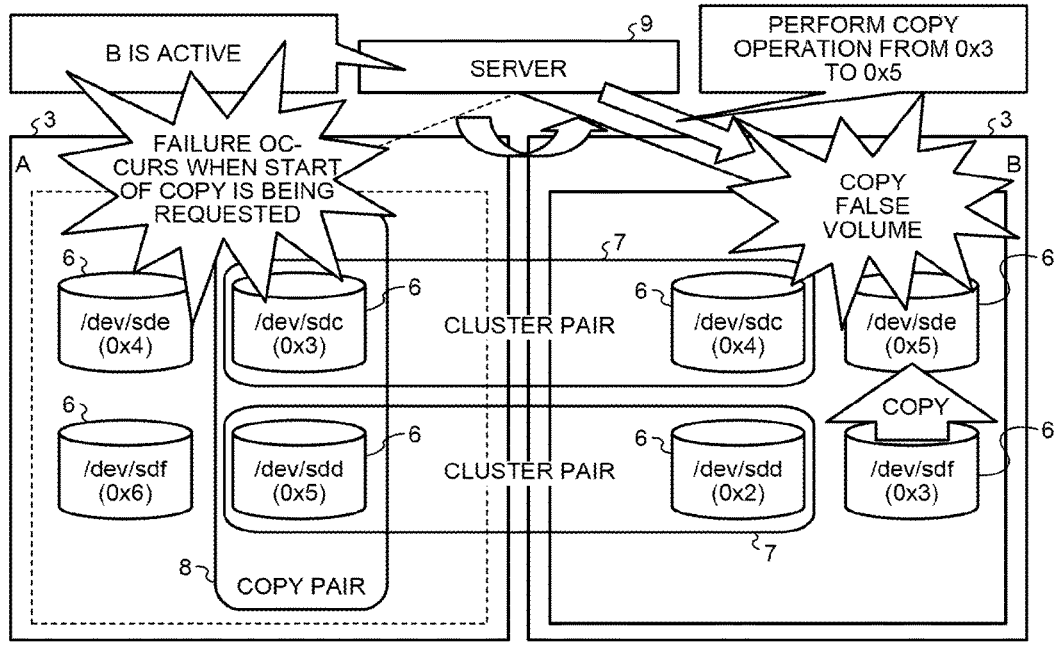
FIG. 4 is a schematic diagram illustrating a problem of a failover occurring when a start of a copy is being requested.

However, if a copy from the LUN (0x3) to the LUN (0x5) is performed in B, because the volumes 6 that are associated with the copy pair 8 in B are the LUN (0x4) and the LUN (0x2), as illustrated in FIG. 4, the false volumes 6 are operated.

As described above, when the server 9 instructs a volume operation, if a failover occurs before the volume operation has been completed, the false volumes 6 are operated in the storage device 3 that has newly become active, which is a problem. The similar problem also occurs in a case in which a failover occurs in a time period after the server 9 converts the device names of the operation target volumes 6 to the LUNs until the server 9 issues an instruction of the volume operation. Furthermore, the similar problem also occurs in a case in which a failover occurs in a time period after the server 9 issues an instruction of the volume operation until the storage device 3 performs the volume operation.

Thus, if a server according to the embodiment sends a copy instruction to the storage device 3, the server sends a copy instruction to an operation volume. The "operation volume" mentioned here is a volume 6 for which Write/Read I/O is not taken over to another storage device 3 even if a failure occurs in the storage device 3.

Figure 5:
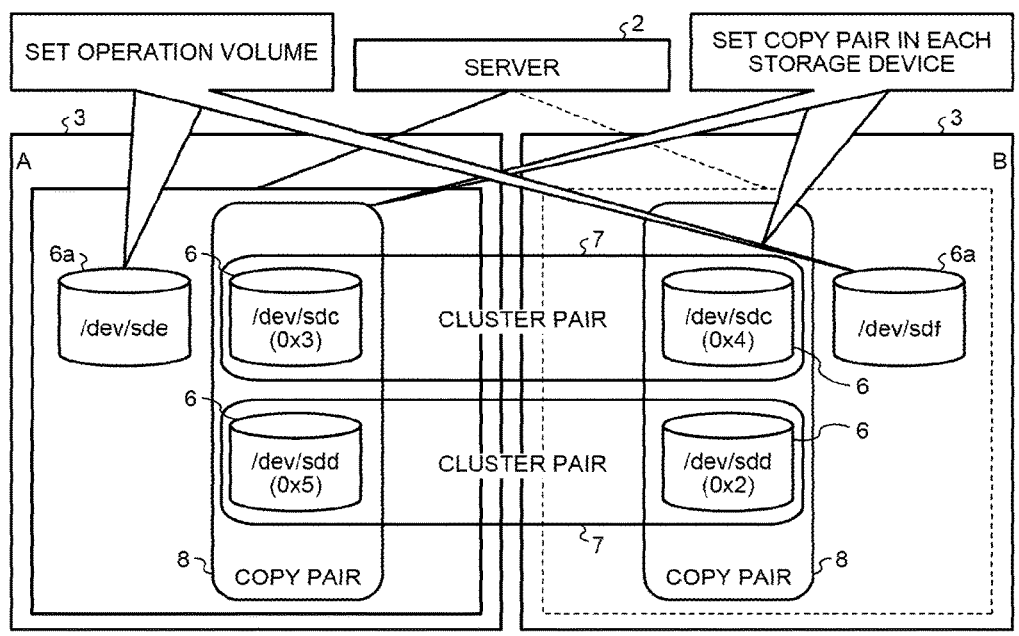
FIG. 5 is a schematic diagram illustrating operation volumes.
Figure 6:
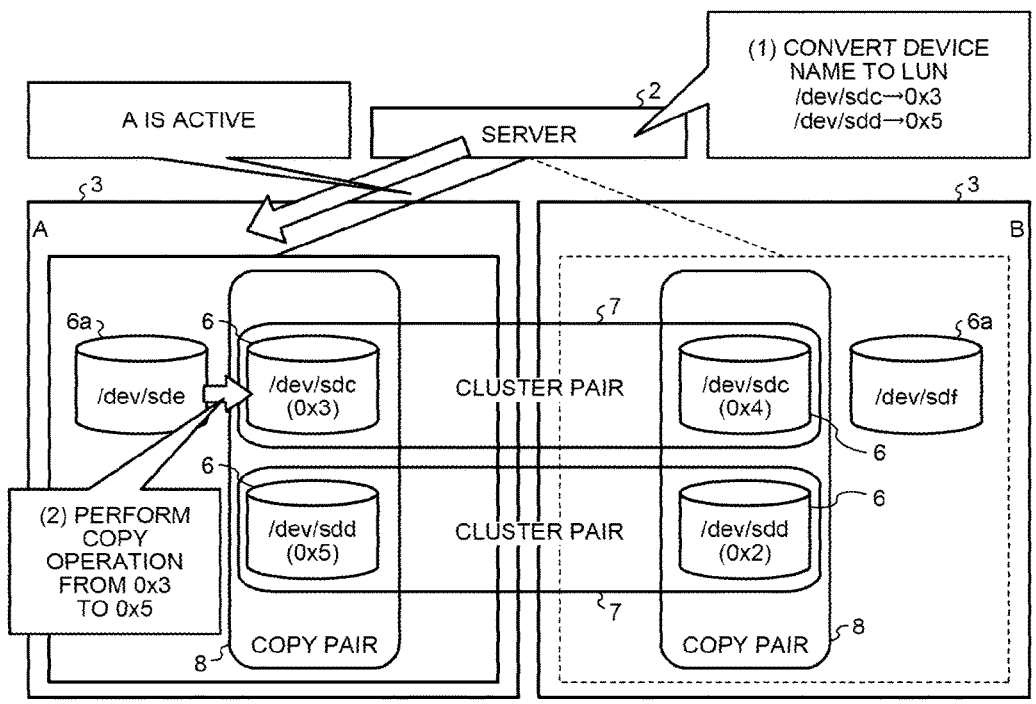
FIG. 6 is a schematic diagram illustrating a copy via the operation volume.

FIG. 5 is a schematic diagram illustrating an operation volume. In FIG. 5, a storage administrator registers /dev/sde as an operation volume 6a in A and registers /dev/sdf as the operation volume 6a in B. When a server 2 according to the embodiment outputs a copy instruction to the storage device 3, as illustrated in FIG. 6, the server 2 converts the device names to the LUNs (1) and instructs the operation volume 6a to perform a copy from the LUN (0x3) to the LUN (0x5). Then, A performs the copy from the LUN (0x3) to the LUN (0x5) instructed with respect to the operation volume 6a (2).

Figure 7:
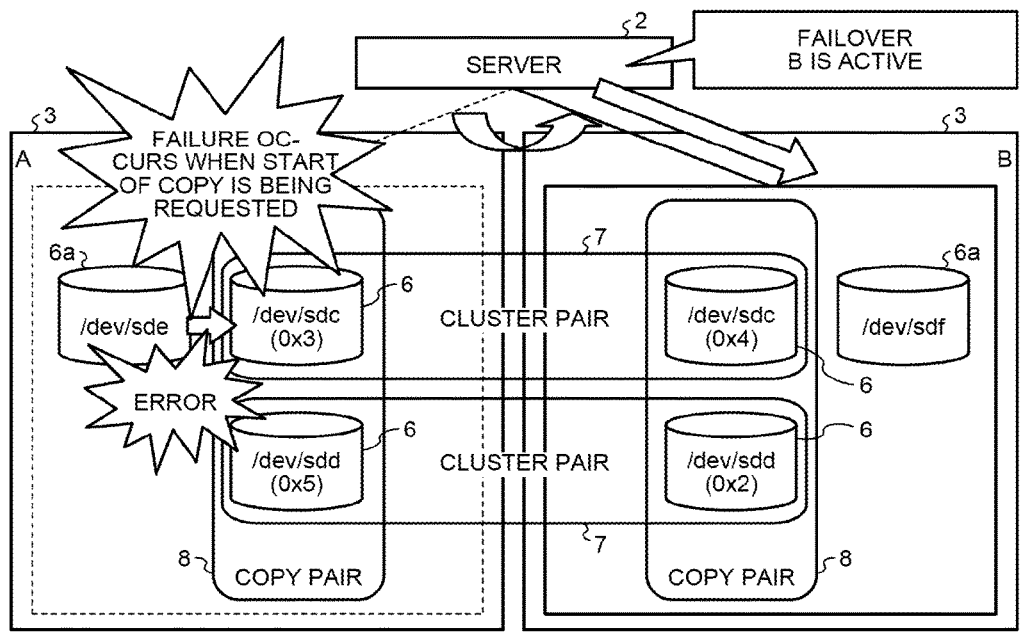
FIG. 7 is a schematic diagram illustrating a failover occurring when a start of a copy is being requested with respect to the operation volume.

Then, if a failure occurs in A when a start of the copy is being requested, as illustrated in FIG. 7, the active storage device 3 is changed to B and the copy operation with respect to the operation volume 6a becomes error. However, the copy instruction with respect to the operation volume 6a is not automatically taken over to B. This is because the operation volume 6a does not constitute the cluster pair 7. Namely, the operation volume 6a does not have a volume to which the copy instruction is taken over.

Figure 8:
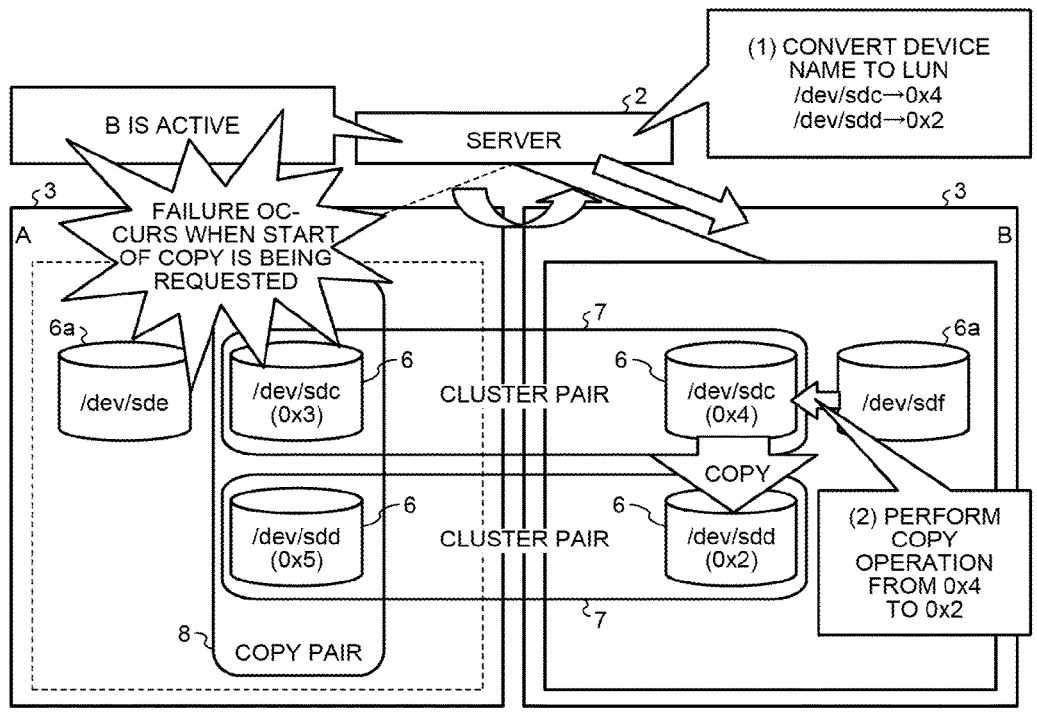
FIG. 8 is a schematic diagram illustrating a copy via the operation volume after the failover.

Because the copy instruction with respect to the operation volume 6a is not taken over to B, the server 2 detects an error and, if the detected error is an error in A that was active before the failover, as illustrated in FIG. 8, the server 2 converts the LUNs of A to the LUNs of B (1). Then, the server 2 instructs the operation volume 6a in B to perform a copy from the LUN (0x4) to the LUN (0x2) (2).

As described above, the server 2 according to the embodiment outputs a copy instruction to the operation volume 6a in A by using the LUNs of A. Then, if a failover from A to B occurs during the copy, an error is notified to the server 2 without the copy instruction with respect to the operation volume 6a in A being automatically taken over to B. Then, the server 2 converts the LUNs of A to the LUNs of B and outputs a copy instruction to the operation volume 6a in B by using the LUNs of B. Accordingly, if a failover occurs, the server 2 can prevents the operation of the false volumes 6 in the storage device 3 that has newly become active.

Figure 9:
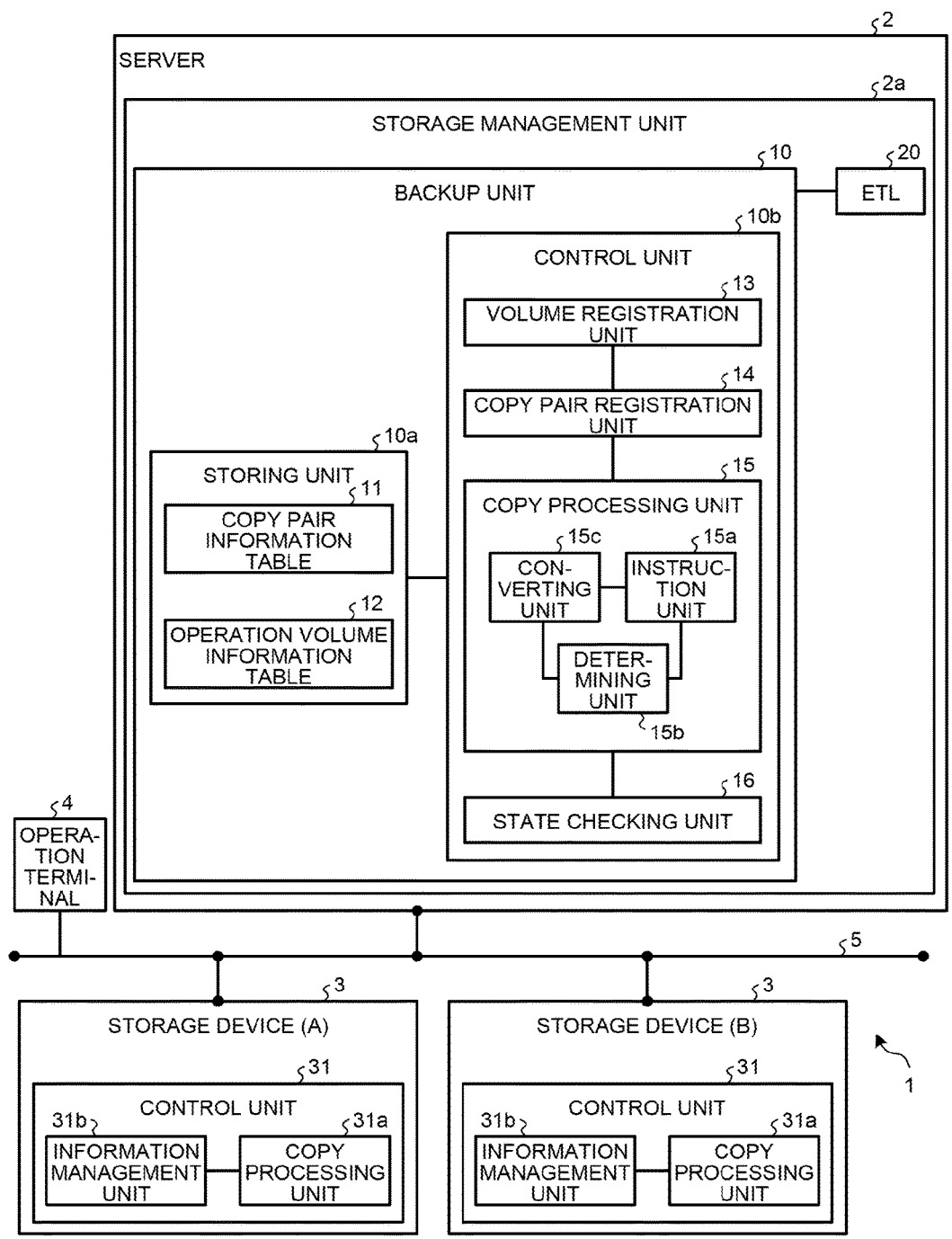
FIG. 9 is a schematic diagram illustrating the configuration of an information processing system according to an embodiment.

In the following, the configuration of an information processing system according to the embodiment will be described. FIG. 9 is a schematic diagram illustrating the configuration of the information processing system according to the embodiment. As illustrated in FIG. 9, the information processing system 1 according to the embodiment includes the server 2, two storage devices 3 constituting a storage cluster, and an operation terminal 4. The server 2, the storage devices 3, and the operation terminal 4 are connected by using a network 5. Furthermore, for convenience of explanation, only the single server 2 and the two storage devices 3 are illustrated; however, the information processing system 1 according to the embodiment may also include a plurality of the servers 2 and an arbitrary number of the storage devices 3 that constitute the storage cluster.

The server 2 is a computer that uses a storage cluster. The server 2 includes a storage management unit 2a as a functioning unit that manages the storage device 3. The storage management unit 2a includes a backup unit 10 and an Extraction, Transformation and Load (ETL) 20. The ETL 20 creates a SCSI command that performs an operation of data extraction, data conversion, data insertion, or the like on the storage device 3. Furthermore, the ETL 20 controls the communication with the storage device 3 via the network 5.

The backup unit 10 outputs an instruction to copy the volume 6 to the storage device 3 in order to create a backup of the volume 6. The backup unit 10 includes a storing unit 10a and a control unit 10b. The storing unit 10a is a functioning unit that stores therein information and includes a copy pair information table 11 as information to be stored. The control unit 10b is a functioning unit that performs a backup process by using the storing unit 10a and includes a volume registration unit 13, a copy pair registration unit 14, a copy processing unit 15, and a state checking unit 16.

The copy pair information table 11 is a table that associates the information about the copy pair 8 with the information about the two volumes 6 in the copy pair 8 and the two volumes 6 each constituting each of the cluster pairs 7. FIG. 10 is a schematic diagram illustrating an example of the copy pair information table 11. As illustrated in FIG. 10, in the copy pair information table 11, copy source information, copy destination information, copy source pair information, and copy destination pair information are included. The Box ID and the LUN are included in each of the pieces of information. The Box ID is an identifier for identifying the storage device 3.

In the copy source information, the Box ID and the LUN of the volume 6 in the copy source are included. In the copy destination information, the Box ID and the LUN of the volume 6 in the copy destination are included. In the copy source pair information, the Box ID and the LUN of the volume 6 that constitutes the cluster pair 7 with the volume 6 in the copy source are included. In the copy destination pair information, the Box ID and the LUN of the volume 6 that constitutes the cluster pair 7 with the volume 6 in the copy destination are included.

For example, the LUN (0x4) and the LUN (0x2) in the storage device 3 that is identified by B are associated with the LUN (0x3) and the LUN (0x5), respectively, that are the copy pair 8 in the storage device 3 that is identified by A.

An operation volume information table 12 is a table in which the storage device 3 is associated with the operation volume 6a. FIG. 11 is a schematic diagram illustrating an example of the operation volume information table 12. As illustrated in FIG. 11, in the operation volume information table 12, an identification name, a Box ID, an address, and an access path are included.

The identification name is a name for a user to identify the operation volume 6a. The Box ID is an identifier for identifying the storage device 3 in which the operation volume 6a is defined. The address is an IP address of the storage device 3. The access path is a device name of the operation volume 6a.

For example, the IP address of the storage device 3 identified by A is 1.1.1.1, the device name of the operation volume 6a in A is /dev/sde, and a user identifies the operation volume 6a in A by ETX.

The volume registration unit 13 registers the information on the operation volume 6a in the operation volume information table 12 on the basis of a request to set the operation volume 6a received from the storage administrator.

The copy pair registration unit 14 registers the information on the copy pair 8 in the copy pair information table 11 on the basis of a request for registration of the copy pair 8 received from the storage administrator. In the information registered in the copy pair information table 11, the information about the two volumes 6 of the copy pair 8 and the two volumes 6 each constituting each of the cluster pairs 7 are included.

The copy processing unit 15 performs a copy process in the copy pair 8. The copy processing unit 15 includes an instruction unit 15a, a determining unit 15b, and a converting unit 15c. The instruction unit 15a specifies the LUNs of the copy source and the copy destination and instructs the operation volume 6a to perform a copy. The determining unit 15b determines, if an error occurs with respect to a copy instruction output to the operation volume 6a, whether a failover has occurred.

If the determining unit 15b determines that a failover has occurred, the converting unit 15c refers to the copy pair information table 11 and converts the LUNs of the copy pair 8 in the storage device 3 in which an error has occurred to the LUNs in the storage device 3 that has newly become active. The converted LUNs are used when the instruction unit 15a outputs a copy instruction to the operation volume 6a in the storage device 3 that has newly become active.

The state checking unit 16 acquires, from the storage device 3 on the basis of a request to check a copy state received from the storage administrator, the information about the status of the copy process and sends the acquired information to the operation terminal 4.

The operation terminal 4 is a device that is used by the storage administrator to manage the storage devices 3. The operation terminal 4 receives, from the storage administrator, a setting request for the operation volume 6a, a registration request for the copy pair 8, a copy request, a check request for the copy state, or the like and sends the received request to the backup unit 10. Furthermore, the operation terminal 4 displays, on the display device, state check information sent from the state checking unit 16.

The storage device 3 is a device that stores therein information used by the server 2. The storage device 3 includes a nonvolatile storage device, such as a hard disk drive (HDD), a solid state drive (SSD), or the like. Furthermore, the storage device 3 includes, as a functioning unit, a control unit 31 that controls the storage devices 3.

The control unit 31 includes a copy processing unit 31a and an information management unit 31b. The copy processing unit 31a performs a copy process on the basis of a copy instruction received from the server 2. If the copy processing unit 31a receives an instruction to perform the copy process with respect to the operation volume 6a, the copy processing unit 31a copies the volumes 6 by using the LUNs of the copy source and the copy destination specified by the copy instruction.

The information management unit 31b manages the information that is used to control the storage device 3 and sends, to the server 2, the information requested on the basis of the request received from the server 2. The information management unit 31b manages information about, for example, the Box ID, the LUNs, or the like of the volumes 6 and sends, if a request is received from the server 2, information about the Box ID, LUNs, or the like of the volumes 6 to the server 2. Furthermore, if the information management unit 31b receives a request from the server 2, the information management unit 31b sends information about the status of a copy process to the server 2.

In the following, the flow of a process performed by the information processing system 1 according to the embodiment will be described. FIGS. 12A to 12E are a first to a fifth flowcharts each illustrating the flow of the process performed by the information processing system 1 according to the embodiment.

As illustrated in FIG. 12A, the operation terminal 4 receives a setting request for the operation volume 6a in the device A from the storage administrator and then instructs the server 2 to set the operation volume 6a in the device A (Step S1). The "device A" mentioned here is the storage device 3 with the Box ID of "A". The storage administrator specifies an identification name of the operation volume 6a and requests the setting.

Then, the backup unit 10 receives the setting instruction of the operation volume 6a and starts to register the operation volume 6a (Step S2). Then, the backup unit 10 instructs the ETL 20 to acquire the Box ID of the operation volume 6a (Step S3). Then, the ETL 20 requests the device A to acquire the Box ID (Step S4) and then the control unit 31 in the device A returns the Box ID to the ETL 20 (Step S5). Then, the ETL 20 returns the Box ID to the backup unit 10.

Then, the backup unit 10 registers, in the operation volume information table 12, the Box ID of the operation volume 6a together with the identification name of the operation volume 6a, the IP address of the storage device 3, and the device name of the operation volume 6a (Step S6). Then, the backup unit 10 completes the registration of the operation volume 6a in the device A (Step S7) and notifies the operation terminal 4 of the completion of the registration.

Then, the operation terminal 4 receives, from the storage administrator, a setting request for the operation volume 6a in the device B and instructs the server 2 to set the operation volume 6a in the device B (Step S8). The storage administrator requests the setting by specifying an identification name of the operation volume 6a.

Then, the backup unit 10 receives a setting instruction of the operation volume 6a and starts to register the operation volume 6a (Step S9). Then, the backup unit 10 instructs the ETL 20 to acquire the Box ID of the operation volume 6a (Step S10). Then, the ETL 20 requests the device B to acquire the Box ID (Step S11) and then the control unit 31 in the device B returns the Box ID to the ETL 20 (Step S12). Then, the ETL 20 returns the Box ID to the backup unit 10.

Then, the backup unit 10 registers, in the operation volume information table 12, the Box ID of the operation volume 6a together with the identification name of the operation volume 6a, the IP address of the storage device 3, and the device name of the operation volume 6a (Step S13). Then, the backup unit 10 completes the registration of the operation volume 6a in the device B (Step S14) and notifies the operation terminal 4 of the completion of the registration.

Then, the operation terminal 4 receives, from the storage administrator, a registration request of the copy pair 8 and instructs the server 2 to register the copy pair 8 (Step S15). Then, the backup unit 10 receives a registration instruction of the copy pair 8 and starts to register the copy pair 8 (Step S16). Then, the backup unit 10 instructs the ETL 20 to acquire the information on the volumes 6 that become the cluster pair 7 (Step S17).

Then, the ETL 20 requests the device A to acquire the Box IDs and the LUNs of the volumes 6 that become the cluster pair 7 (Step S18) and then the control unit 31 in the device A returns the Box IDs and the LUNs of the volumes 6 that become the cluster pair 7 to the ETL 20 (Step S19). Then, the ETL 20 returns the Box IDs and the LUNs of the volumes 6 that become the cluster pair 7 to the backup unit 10.

Then, the backup unit 10 registers, in the copy pair information table 11, the Box ID and the LUNs of the two volumes 6 that become the copy pair 8 together with the Box ID and the LUNs of the two volumes 6 that each constitute the cluster pair 7 with each of the volumes 6 (Step S20). Then, the backup unit 10 completes the registration of the copy pair 8 (Step S21) and notifies the operation terminal 4 of the completion of the registration. Then, the operation terminal 4 displays the copy pair (Step S22).

Figure 12B:
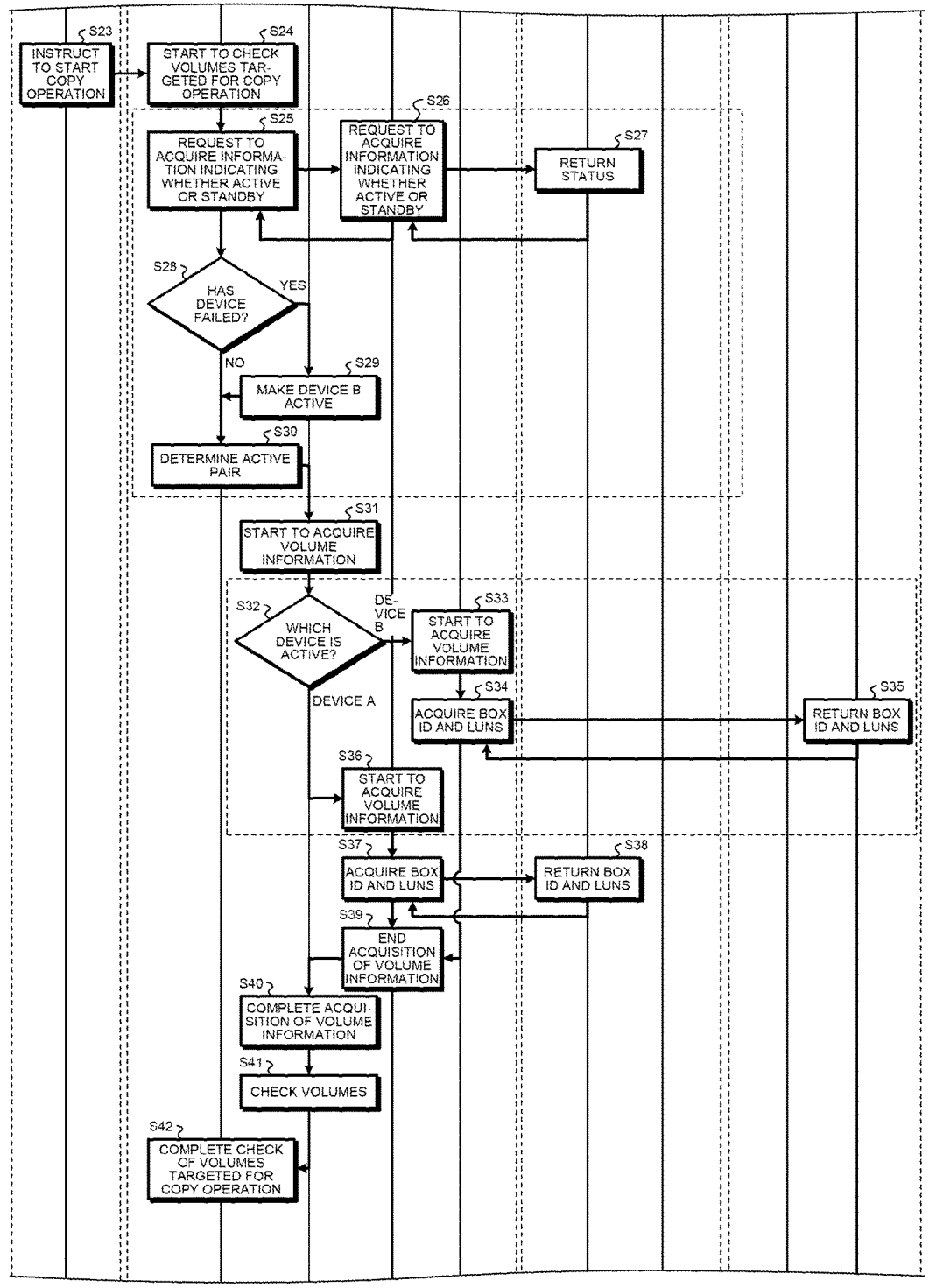
FIG. 12B is a second flowchart illustrating the flow of a process performed by the information processing system according to the embodiment.
Figure 12C:
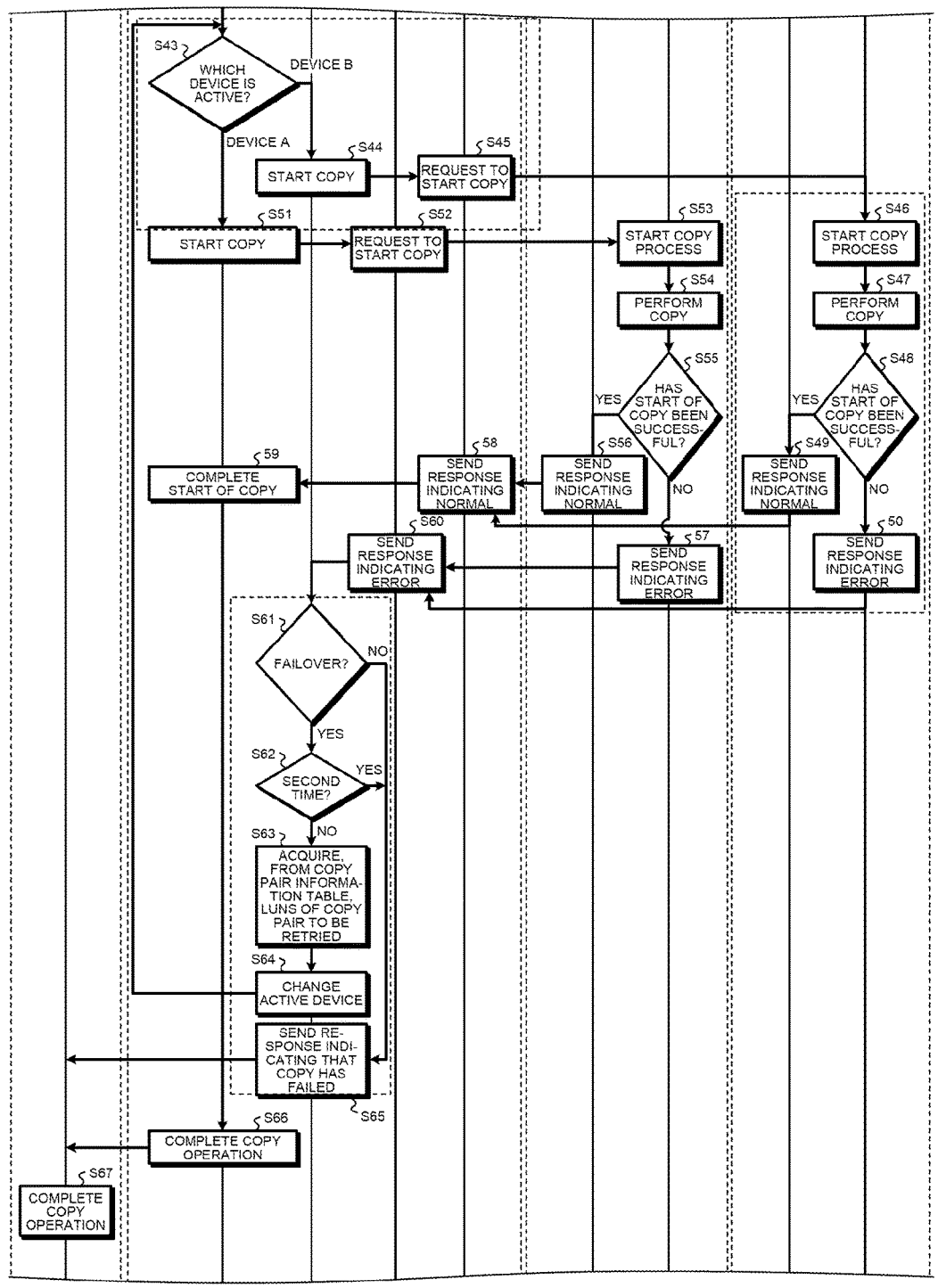
FIG. 12C is a third flowchart illustrating the flow of a process performed by the information processing system according to the embodiment.

Then, as illustrated in FIG. 12B, the operation terminal 4 receives a start request of the copy operation from the storage administrator and instructs the server 2 to start the copy operation (Step S23). Then, the backup unit 10 starts to check the volumes 6 targeted for the copy operation (Step S24) and requests the ETL 20 to acquire the information indicating whether the device A is active or standby (Step S25).

Then, the ETL 20 requests the device A to acquire the information indicating whether the device A is active or standby (Step S26) and the control unit 31 in the device A returns the status of the device A (Step S27). Then, the ETL 20 returns the status of the device A to the backup unit 10.

Then, the backup unit 10 determines whether the device A has failed, i.e., whether the device A is active (Step S28). If the device A has failed, the backup unit 10 makes the device B active (Step S29). Then, the backup unit 10 determines an active pair (Step S30). The "active pair" mentioned here is the copy pair 8 in the active storage device 3.

Then, the backup unit 10 starts to acquire the volume information on the copy pair 8 (Step S31) and decides which is an active device (Step S32). When the device B is active, the ETL 20 starts to acquire the volume information from the device B (Step S33) and requests the device B to acquire the Box ID and the LUNs (Step S34). Then, the control unit 31 in the device B returns the Box ID and the LUNs to the ETL 20 (Step S35) and the ETL 20 proceeds to Step S39.

In contrast, when the device A is active, the ETL 20 starts to acquire the volume information from the device A (Step S36) and requests the device A to acquire the Box ID and the LUNs (Step S37). Then, the control unit 31 in the device A returns the Box ID and the LUNs to the ETL 20 (Step S38).

Then, the ETL 20 ends the acquisition of the volume information (Step S39) and sends the acquired volume information to the backup unit 10. Then, the backup unit 10 completes the acquisition of the volume information (Step S40) and checks the volumes on the basis of the acquired volume information (Step S41). Then, the backup unit 10 completes the check of the volumes targeted for the copy operation (Step S42).

Then, the backup unit 10 decides which is an active device (Step S43). When the device B is active, the backup unit 10 starts to perform a copy in the device B (Step S44) and requests the operation volume 6a in the device B to start the copy (Step S45). Then, the control unit 31 in the device B starts the copy process (Step S46) and performs the copy (Step S47). Then, the control unit 31 in the device B determines whether the start of the copy has been successful (Step S48). If the start of the copy has been successful, the control unit 31 sends a response to the server 2 indicating normal (Step S49) and, if the start of the copy has not been successful, the control unit 31 sends a response to the server 2 indicating an error (Step S50).

In contrast, when the device A is active, the backup unit 10 starts to perform a copy in the device A (Step S51) and requests the operation volume 6a in the device A to start the copy (Step S52). Then the control unit 31 in the device A starts the copy process (Step S53) and performs the copy (Step S54). Then, the control unit 31 in the device A determines whether the start of the copy has been successful (Step S55). If the start of the copy has been successful, the control unit 31 sends a response to the server 2 indicating normal (Step S56) and, if the start of the copy has not been successful, the control unit 31 sends a response to the server 2 indicating an error (Step S57).

Then, when the ETL 20 receives a response from the device A or the device B indicating normal, the ETL 20 sends a response to the backup unit 10 indicating normal (Step S58) and the backup unit 10 completes the start of the copy (Step S59). Then, the backup unit 10 notifies the operation terminal 4 of the completion of the copy operation (Step S66) and the operation terminal 4 completes the copy operation (Step S67).

Furthermore, when the ETL 20 receives, from the device A or the device B, a response indicating an error, the ETL 20 sends the response indicating an error to the backup unit 10 (Step S60) and determines whether a failover occurs in the backup unit 10 (Step S61). When the determination result indicates that the failover does not occur, the backup unit 10 sends a response to the operation terminal 4 indicating that the copy has failed (Step S65) and the operation terminal 4 completes the copy operation (Step S67).

In contrast, when a failover occurs, the backup unit 10 determines whether the error is the second time (Step S62). If the error is the second time, the backup unit 10 sends a response to the operation terminal 4 indicating that the copy has failed (Step S65) and the operation terminal 4 completes the copy operation (Step S67). In contrast, if the error is not the second time, the backup unit 10 acquires, from the copy pair information table 11, the LUNs of the copy pair 8 to be retried (Step S63) and changes the active device (Step S64). Then, the backup unit 10 returns to Step S43 to retry the copy in the storage device 3 that has newly become active.

Figure 12D:
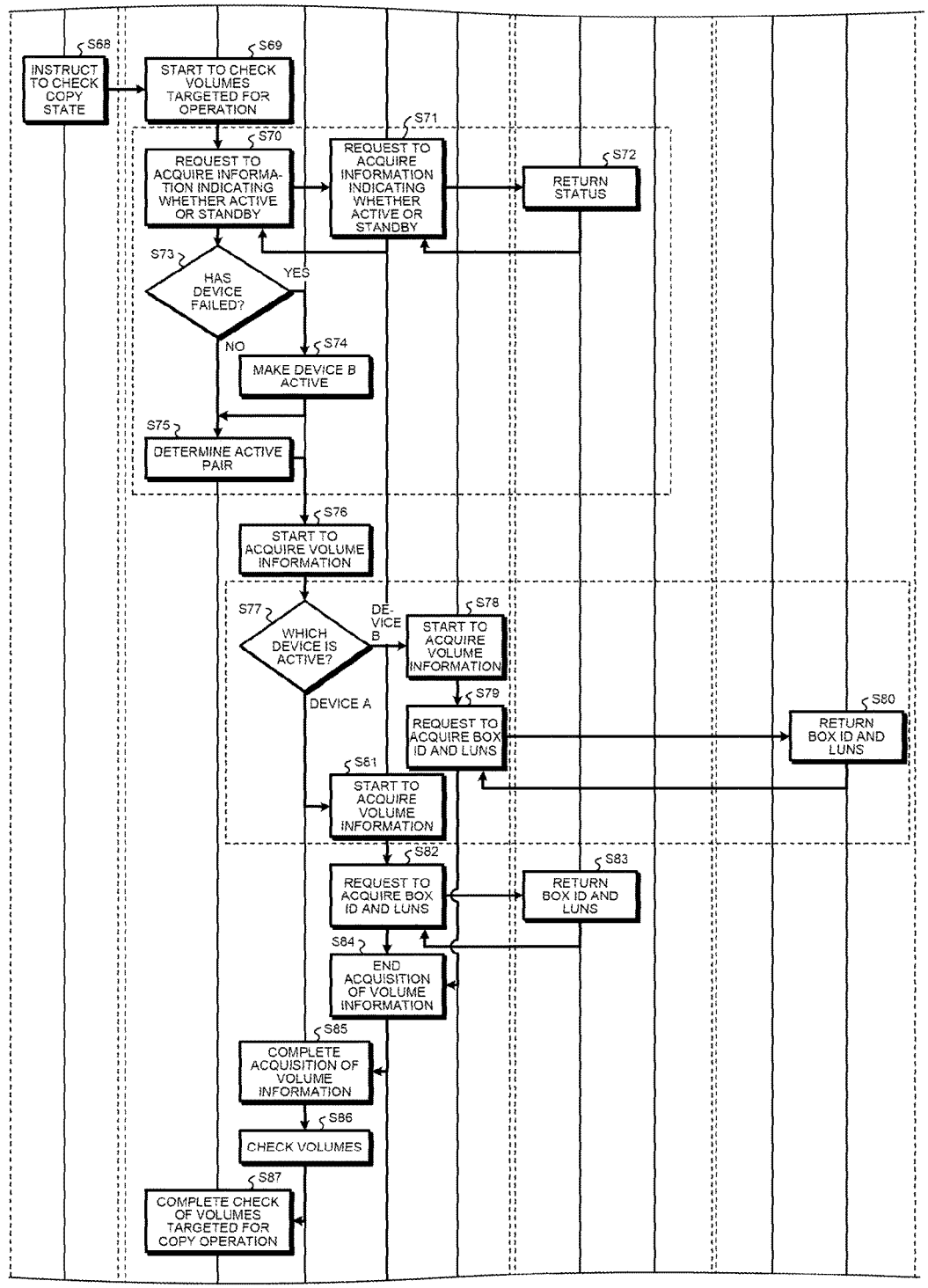
FIG. 12D is a fourth flowchart illustrating the flow of a process performed by the information processing system according to the embodiment.

Then, as illustrated in FIG. 12D, the operation terminal 4 receives a request for a check of the copy state from the storage administrator and instructs the server 2 to check the copy state (Step S68). Then, the backup unit 10 starts to check the volumes 6 targeted for the copy operation (Step S69) and requests the ETL 20 to acquire the information indicating whether the device A is active or standby (Step S70).

Then, the ETL 20 requests the device A to acquire the information indicating whether the device A is active or standby (Step S71) and the control unit 31 in the device A returns the status of the device A (Step S72). Then, the ETL 20 returns the status of the device A to the backup unit 10.

Then, the backup unit 10 determines whether the device A has failed or not, i.e., whether the device A is active or not (Step S73). If the device A has failed, the backup unit 10 makes the device B active (Step S74). Then, the backup unit 10 determines an active pair (Step S75).

Then, the backup unit 10 starts to acquire the volume information on the copy pair 8 (Step S76) and decides which is an active device (Step S77). When the device B is active, the ETL 20 starts to acquire the volume information from the device B (Step S78) and requests the device B to acquire the Box ID and the LUNs (Step S79). Then, the control unit 31 in the device B returns the Box ID and the LUNs to the ETL 20 (Step S80) and the ETL 20 proceeds to Step S84.

In contrast, when the device A is active, the ETL 20 starts to acquire the volume information from the device A (Step S81) and requests the device A to acquire the Box ID and the LUNs (Step S82). Then, the control unit 31 in the device A returns the Box ID and the LUNs to the ETL 20 (Step S83).

Then, the ETL 20 ends the acquisition of the volume information (Step S84), and sends the acquired volume information to the backup unit 10. Then, the backup unit 10 completes the acquisition of the volume information (Step S85) and checks the volumes on the basis of the acquired volume information (Step S86). Then, the backup unit 10 completes the check of the volumes targeted for the copy operation (Step S87).

Figure 12E:
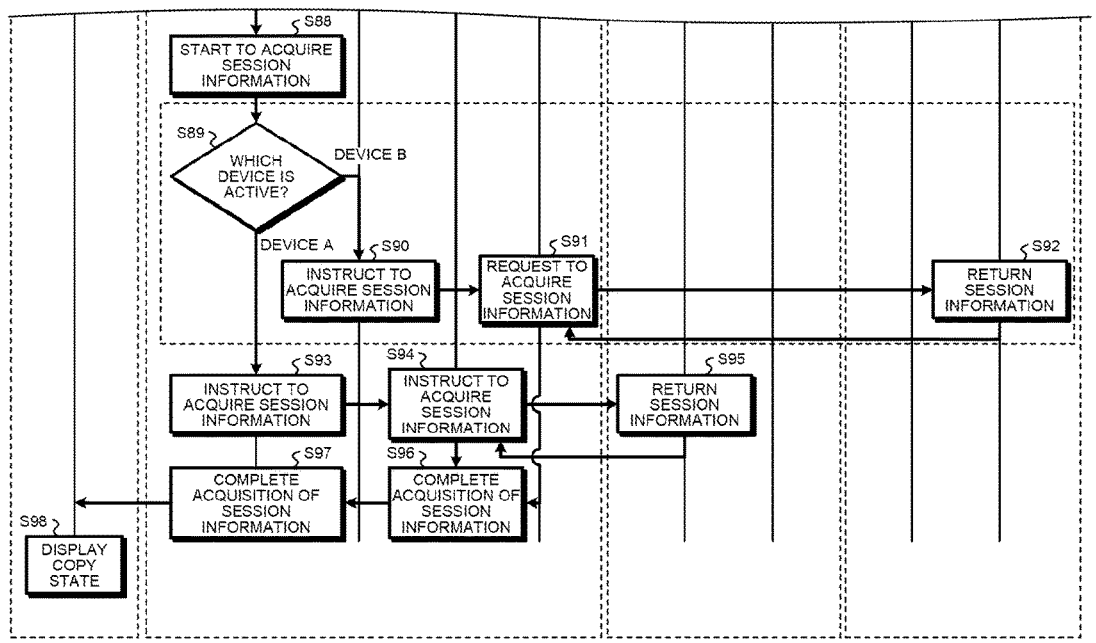
FIG. 12E is a fifth flowchart illustrating the flow of a process performed by the information processing system according to the embodiment.

Then, as illustrated in FIG. 12E, the backup unit 10 starts to acquire the session information about the copy process (Step S88) and decides which is an active device (Step S89). When the device B is active, the backup unit 10 instructs the ETL 20 to acquire the session information from the device B (Step S90) and the ETL 20 requests the device B to acquire the session information (Step S91). Then, the control unit 31 in the device B returns the session information to the ETL 20 (Step S92) and the ETL 20 proceeds to Step S96.

In contrast, when the device A is active, the backup unit 10 instructs the ETL 20 to acquire the session information from the device A (Step S93) and the ETL 20 requests the device A to acquire the session information (Step S94). Then, the control unit 31 in the device A returns the session information to the ETL 20 (Step S95).

Then, the ETL 20 sends the session information to the backup unit 10 and completes the acquisition of the session information (Step S96). Then, the backup unit 10 sends the session information to the operation terminal 4 and completes the acquisition of the session information (Step S97). Then, the operation terminal 4 displays the copy state on the basis of the session information (Step S98).

As described above, if an error occurs in the copy process due to the occurrence of a failover, the backup unit 10 acquires, from the copy pair information table 11, the LUNs of the copy pair 8 to be retried and again performs the copy process in the storage device 3 that has newly become active. Accordingly, the storage management unit 2a can instruct to perform the copy by specifying the correct LUNs after the failover.

Furthermore, in the embodiment, a description has been given of the storage management unit 2a; however, by implementing the configuration included in the storage management unit 2a by software, it is possible to obtain a storage management program having the same function as is performed by the storage management unit 2a. Accordingly, the hardware configuration of the server 2 that executes the storage management program will be described.

Figure 13:
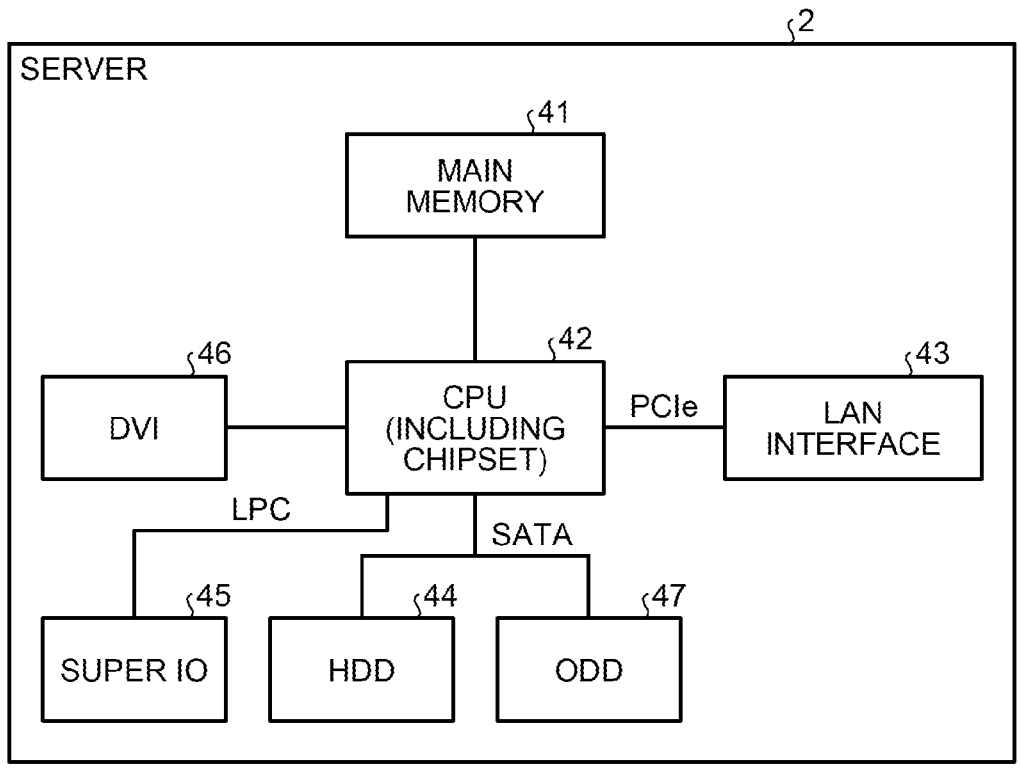
FIG. 13 is a block diagram illustrating the hardware configuration of a server.

FIG. 13 is a block diagram illustrating the hardware configuration of the server 2. As illustrated in FIG. 13, the server 2 includes a main memory 41, a central processing unit (CPU) 42, a local area network (LAN) interface 43, and a hard disk drive (HDD) 44. Furthermore, the server 2 includes a super input/output (IO) 45, a digital visual interface (DVI) 46, and an optical disk drive (ODD) 47.

The main memory 41 is a memory that stores therein programs, intermediate results of the programs, or the like. The CPU 42 is a central processing unit that reads a program from the main memory 41 and executes the program. The CPU 42 includes a chipset that has a memory controller.

The LAN interface 43 is an interface for connecting the server 2 to another computer via a LAN. The HDD 44 is a disk device that stores therein programs or data and the super IO 45 is an interface for connecting an input device, such as a mouse, a keyboard, or the like. The DVI 46 is an interface for connecting a liquid crystal display device and the ODD 47 is a device that reads and writes a DVD.

The LAN interface 43 is connected to the CPU 42 by a PCI Express (PCIe). The HDD 44 and the ODD 47 are connected to the CPU 42 by a serial advanced technology attachment (SATA). The super IO 45 is connected to the CPU 42 by the low pin count (LPC).

Then, the storage management program executed by the server 2 is stored in the DVD, is read from the DVD by the ODD 47, and is installed in the server 2. Alternatively, the storage management program is stored in a database or the like in another computer system that is connected via the LAN interface 43, is read from the database, and is installed in the server 2. Then, the installed storage management program is stored in the HDD 44, is read to the main memory 41, and is executed by the CPU 42.

Figure 14:
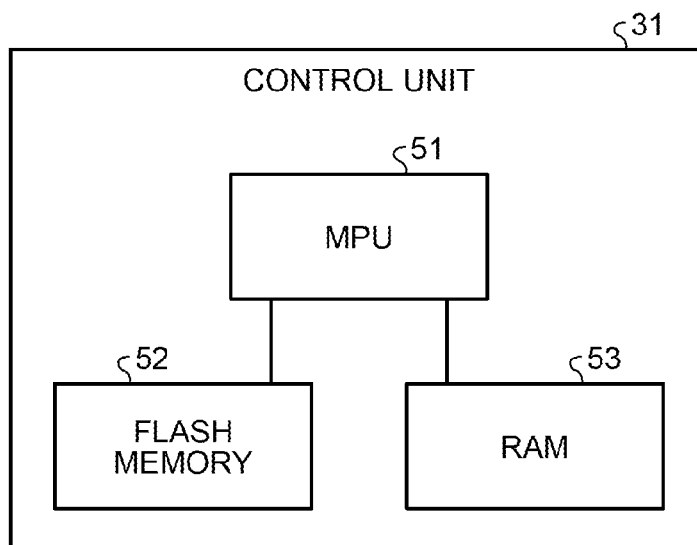
FIG. 14 is a block diagram illustrating the hardware configuration of a control unit.

Furthermore, in the embodiment, a description has been given of the control unit 31 in the storage device 3; however, the control unit 31 is implemented by firmware. Accordingly, the hardware configuration of the control unit 31 that executes the firmware will be described. FIG. 14 is a block diagram illustrating the hardware configuration of the control unit 31. As illustrated in FIG. 14, the control unit 31 includes a micro processing unit (MPU) 51, a flash memory 52, and a random access memory (RAM) 53.

The MPU 51 is a processing unit that reads the firmware stored in the RAM 53 and that executes the read firmware. The flash memory 52 is a nonvolatile memory that stores therein the firmware. The RAM 53 is a volatile memory that stores therein the firmware read from the flash memory 52. Furthermore, the RAM 53 stores therein data needed to execute the firmware, intermediate results of the firmware, or the like.

As described above, in the embodiment, the backup unit 10 specifies the LUNs of the copy source and the copy destination to the operation volume 6a, for which when a failure occurs in the storage device 3 a process is not taken over to another storage device 3, and instructs to perform a copy. Then, when the copy processing unit 31a in the storage device 3 receives the copy process with respect to the operation volume 6a, the copy processing unit 31a performs the copy process by using the LUNs of the copy source and the copy destination.

Then, if an error occurs without the copy process being taken over to another storage device 3 due to the occurrence of a failover, the backup unit 10 acquires the LUNs of the two volumes 6 of the copy pair 8 and the two volumes 6 each constituting each of the cluster pairs 7. Then, the backup unit 10 again performs, by using the acquired LUNs, the copy process in the storage device 3 that has newly become active.

Accordingly, regarding the copy instruction that is being processed when a failover occurs, the storage cluster can perform a copy, by using the correct LUNs, in the storage device 3 that has newly become active.

Furthermore, in the embodiment, in the copy pair information table 11, the information that associates the LUNs of the copy pair 8 with the LUNs of the two volumes 6 of the copy pair 8 and the two volumes 6 each constituting each of the cluster pairs 7 is registered. Then, if an error occurs in the copy process due to a failover, the backup unit 10 refers to the copy pair information table 11 and acquires the LUNs of the copy source and the copy destination that are used for the re-instruction of the copy. Accordingly, the backup unit 10 can easily acquire the LUNs of the copy source and the copy destination that are used after the failover.

Furthermore, in the embodiment, in the operation volume information table 12, the information that associates the Box IDs of the storage devices 3 with the device names of the operation volumes 6a is registered and the backup unit 10 acquires the operation volume 6a by using the operation volume information table 12. Accordingly, the backup unit 10 can easily acquire the device name of the operation volume 6a targeted for the copy instruction.

Furthermore, in the embodiment, a description has been given of a case in which, if a failover occurs, the LUNs of the copy pair in A are converted to the LUNs in B; however, the present invention is not limited thereto but may also be applied to a case of converting to the LUNs in B from the device names.

Furthermore, in the embodiment, a description has been given of a case in which the server 2 includes the backup unit 10; however, the present invention is not limited thereto but may also be applied to a case in which the storage device 3 includes the backup unit. Furthermore, the backup unit 10 may also be a device separate from both the server 2 and the storage device 3.

Furthermore, in the embodiment, a description has been given of the backup unit 10; however, the present invention is not limited thereto but may also be applied to a copy management unit that manages a copy of the volumes 6

According to an aspect of the embodiment, an advantage is provided in that a correct volume can be operated when a failover occurs.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage management device that takes over, when a failure occurs in a first storage device, an operation performed in the first storage device to a second storage device, the storage management device comprising a memory and a processor coupled to the memory, the processor executing a process including:
- determining, when an error occurs in a copy that is instructed to a first storage area for which the copy is not taken over to the second storage device when a failure occurs in the first storage device, whether a takeover from the first storage device to the second storage device has been performed;
- converting, when it is determined at the determining that the takeover has been performed, a first copy source identifier and a first copy destination identifier for identifying a copy source and a copy destination, respectively, in the first storage device to a second copy source identifier and a second copy destination identifier for identifying a copy source and a copy destination, respectively, in the second storage device; and
- instructing a second storage area for which the copy is not taken over to the first storage device when a failure occurs in the second storage device, to perform the copy by using the second copy source identifier and the second copy destination identifier.

2. The storage management device according to claim 1, wherein the converting includes a converting using a storing unit that stores the first copy source identifier and the first copy destination identifier in association with the second copy source identifier and the second copy destination identifier.

3. The storage management device according to claim 2, wherein
- the storing unit further stores therein information about the first storage area and the second storage area, and
- the instructing includes instructing to perform a copy by using the information about the second storage area stored in the storing unit.

4. The storage management device according to claim 1, wherein the converting includes determining whether an occurrence of the error is a second time, converting, when the occurrence of the error is a first time, the first copy source identifier and the first copy destination identifier to the second copy source identifier and the second copy destination identifier, respectively, and determining, when the occurrence of the error is the second time, that the copy has failed.

5. A computer-readable recording medium having stored therein a storage management program that causes a computer, which is included in a storage management device that takes over an operation performed in a first storage device to a second storage device when a failure occurs in the first storage device, to execute a process comprising:
- determining, when an error occurs in a copy that is instructed to a first storage area for which the copy is not taken over to the second storage device when a failure occurs in the first storage device, whether a takeover from the first storage device to the second storage device has been performed;
- converting, when it is determined that the takeover has been performed, a first copy source identifier and a first copy destination identifier for identifying a copy source and a copy destination, respectively, in the first storage device to a second copy source identifier and a second copy destination identifier for identifying a copy source and a copy destination, respectively, in the second storage device; and
- instructing a second storage area for which the copy is not taken over to the first storage device when a failure occurs in the second storage device, to perform the copy, by using the second copy source identifier and the second copy destination identifier.

* * * * *